UNITED STATES PATENT OFFICE.

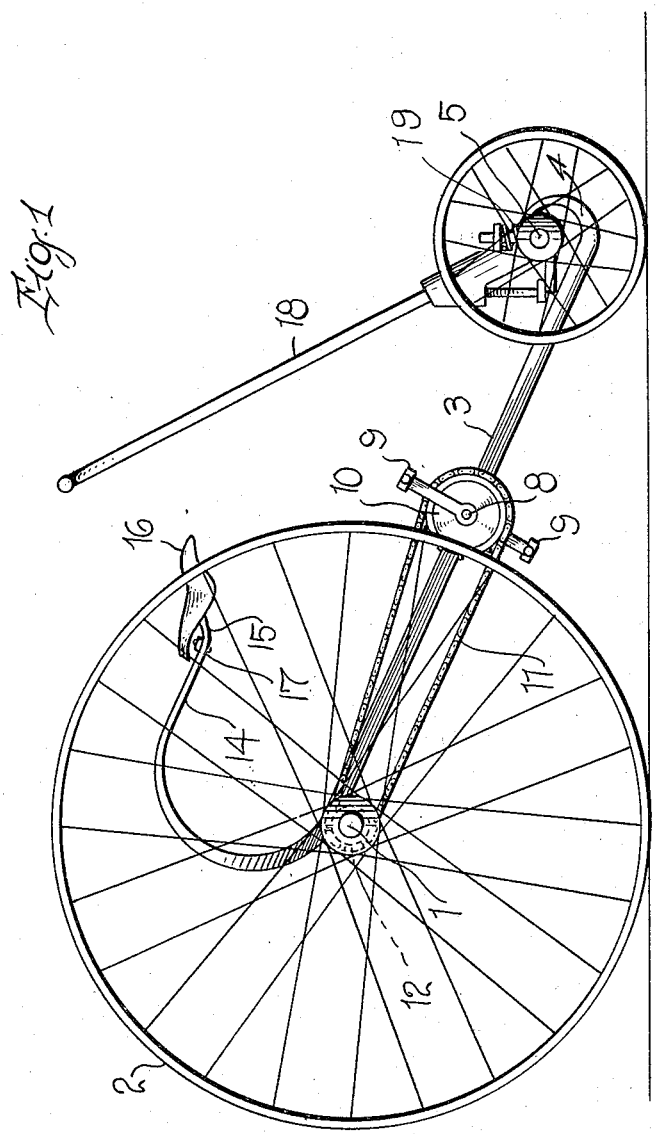

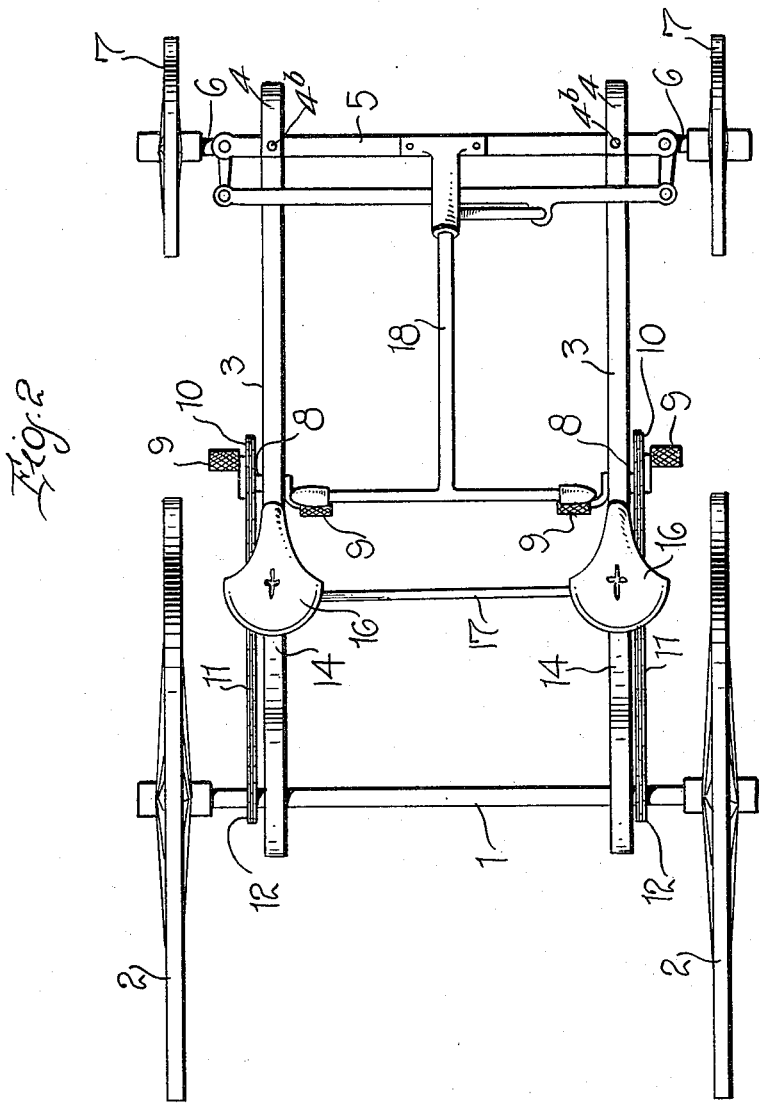

DAVID H. RINEHART, OF PALERMO, ILLINOIS.

FRAME FOR VELOCIPEDES.

1,146,280.  Specification of Letters Patent.  Patented July 13, 1915.

Application filed July 25, 1914. Serial No. 853,130.

*To all whom it may concern:*

Be it known that I, DAVID H. RINEHART, a citizen of the United States, residing at Palermo, in the county of Edgar and State of Illinois, have invented certain new and useful Improvements in Frames for Velocipedes, of which the following is a specification, reference being had to the accompanying drawings.

This invention relates to certain improvements in frames for velocipedes, and the object of the invention is to provide a novel and improved device of this general character comprising comparatively few parts which are capable of ready and convenient assemblage and affording a device which may be used with a maximum of comfort.

The invention consists in the details of construction and in the combination and arrangement of the several parts of my improved velocipede, whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in side elevation of a frame of a velocipede constructed in accordance with an embodiment of my invention; and Fig. 2 is a view in top plan of the device as disclosed in Fig. 1.

As disclosed in the accompanying drawings, 1 denotes the rear axle having mounted thereon the supporting wheels 2 and projecting forwardly from the axle 1 on a downward incline are the spaced parallel members 3 terminating in the upwardly and rearwardly curved portions 4 suitably secured, as indicated at 4ᵇ to the forward axle 5, the opposite extremities of which have hingedly engaged therewith the spindles 6, on which are positioned the pilot wheels 7 of a diameter materially less than the diameter of the supporting wheels 2, as is believed to be clearly shown in the accompanying drawings.

At a predetermined point intermediate their lengths, the members 3 support the transversely disposed alined shafts 8, each of which having operatively engaged with the extremities thereof the pedals 9 and also provided with a sprocket 10 around which is disposed a chain 11, also directed around a sprocket 12 fixed to the shaft 1, whereby it will be readily perceived that the requisite axial rotation may be imparted thereto for propelling the velocipede.

As herein disclosed, my improved device is adapted to accommodate two occupants and projecting upwardly from the upper or rear extremities o feach of themembers 3 is a spring 14 terminating in the forwardly directed portions 15, to which is suitably secured a seat structure 16 whereby it will be observed that the occupant of such seat is positioned forwardly of the axle 1.

In order to maintain the structure 16 against undue transverse movement, I find it of advantage to tie or connect the same by the intermediate bar 17.

Any suitable steering mechanism may be employed to coact with the hinged spindles 6 for guiding the device and for this reason, it is not thought that a detailed description or illustration thereof is necessary and therefore I indicate this mechanism, as herein embodied, by the general reference 18. I also find it of advantage in practice to employ in connection with each spindle 6, the coil springs 19 operatively engaged therewith at one extremity, while the opposite extremities of such springs are connected in any conventional manner with the axle 5.

From the foregoing description, it is thought to be obvious that a frame for a velocipede constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A device of the character described comprising a forward and rear shaft, wheels mounted thereon, the forward wheels being of less diameters than the rear wheels, elongated members supported by the rear axle and depending forwardly on a downward incline and terminating in upwardly and rearwardly curved portions, the free extremities thereof being secured to the front axle, and means carried by the members intermediate their lengths coacting with the rear axle for imparting axial rotation thereto.

2. A device of the character described comprising a forward and rear shaft, wheels mounted thereon, the forward wheels being of less diameters than the rear wheels, elongated members supported by the rear axle and depending forwardly on a downward incline and terminating in upwardly and rearwardly curved portions, the free extremities thereof being secured to the front axle, means carried by the members intermediate their lengths coacting with the rear axle for imparting axial rotation thereto, upwardly disposed spring members carried by the rear extremities of the members and projecting forwardly of the rear axle, and a seat structure carried by the forward extremity of each of the spring members.

In testimony whereof I hereunto affix my signature in the presence of two witnesses.

DAVID H. RINEHART.

Witnesses:
CHESTER LOUGH,
WADE A. HOLTON.

Copies of this patent may be obtained for five cents each, by addressing the "Commissioner of Patents, Washington, D. C."